(12) United States Patent
Tully

(10) Patent No.: US 11,647,742 B2
(45) Date of Patent: May 16, 2023

(54) GAME DECOY SYSTEM

(71) Applicant: Rick H Tully, West Salem, WI (US)

(72) Inventor: Rick H Tully, West Salem, WI (US)

(73) Assignee: Rick Tully, West Salem, WI (US)

( * ) Notice: Subject to any disclaimer, the term of this patent is extended or adjusted under 35 U.S.C. 154(b) by 0 days.

(21) Appl. No.: 17/749,811

(22) Filed: May 20, 2022

(65) Prior Publication Data

US 2022/0369622 A1    Nov. 24, 2022

Related U.S. Application Data

(60) Provisional application No. 63/191,478, filed on May 21, 2021.

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
USPC ......................................................... 43/2, 3
See application file for complete search history.

(56) References Cited

U.S. PATENT DOCUMENTS

| | | | | | |
|---|---|---|---|---|---|
| 2,547,286 | A | * | 4/1951 | Sabin | A01M 31/06 43/3 |
| 2,726,469 | A | * | 12/1955 | Becker | A01M 31/06 43/3 |
| 2,787,074 | A | * | 4/1957 | Miller | A01M 31/06 D22/125 |
| 5,392,554 | A | * | 2/1995 | Farstad | A01M 31/06 43/3 |
| 5,787,632 | A | * | 8/1998 | Kraut | A01M 31/06 135/901 |
| 5,903,997 | A | * | 5/1999 | Jacob | A01M 31/06 43/2 |
| 6,349,497 | B1 | * | 2/2002 | Roddenbery | A01M 31/06 43/2 |
| 6,481,147 | B2 | * | 11/2002 | Lindaman | A01M 31/06 43/2 |
| 6,574,904 | B1 | * | 6/2003 | Fencel | A01M 31/06 43/3 |
| 6,834,458 | B1 | * | 12/2004 | Hand, III | A01M 31/06 43/2 |

(Continued)

FOREIGN PATENT DOCUMENTS

| | | | | |
|---|---|---|---|---|
| CA | 2866994 A1 | * | 4/2015 | ............ A01M 31/06 |
| FR | 1436463 A | * | 4/1966 | |

*Primary Examiner* — Darren W Ark
(74) *Attorney, Agent, or Firm* — Charles S. Sara; DeWitt LLP

(57) ABSTRACT

A wind-aided game decoy system that allows for multiple decoys moving independently on a single support. The system comprises multiple pivot arms holding multiple decoys. The pivot arms are attached to pivot channels on a wheel hub. The wheel hub is rotatably mounted to a support. The wheel hub may further comprise pin bores along the peripheral edge of the wheel hub allowing a user to adjust the swing of the pivot arms with insertion and removal of pins. The support of the wheel hub can be a stake with one end inserted into a ground and another end connected to the wheel hub. Alternatively, the wheel hub may be moved away from the stake by using an extension arm that connects to a bearing case and runs to the wheel hub, wherein the bearing case is connected to the stake.

14 Claims, 6 Drawing Sheets

(56) References Cited

U.S. PATENT DOCUMENTS

| | | | |
|---|---|---|---|
| 6,907,688 B2* | 6/2005 | Brint | A01M 31/06 43/2 |
| 7,028,429 B1* | 4/2006 | Druliner | A01M 31/06 43/3 |
| 7,082,710 B1* | 8/2006 | Jorgenson | A01M 31/06 43/2 |
| 7,137,221 B2* | 11/2006 | Highby | A01M 31/06 43/2 |
| 7,272,905 B1* | 9/2007 | Horton | A01M 31/06 43/2 |
| 7,562,487 B2* | 7/2009 | Barr | A01M 31/06 43/2 |
| 8,151,512 B2* | 4/2012 | Latschaw | A01M 31/06 43/2 |
| 8,316,575 B2* | 11/2012 | Bradley | A01M 31/06 43/2 |
| 9,661,840 B1* | 5/2017 | Brain | A01M 31/06 |
| 9,686,977 B2* | 6/2017 | Schauer | A01M 31/06 |
| 11,147,264 B1* | 10/2021 | Reynoso | A01M 31/06 |
| 2001/0004812 A1* | 6/2001 | Lindaman | A01M 31/06 248/156 |
| 2003/0101635 A1* | 6/2003 | Fencel | A01M 31/06 43/3 |
| 2003/0196367 A1* | 10/2003 | Powell | A01M 31/06 43/3 |
| 2003/0208944 A1* | 11/2003 | Olson | A01M 31/06 43/3 |
| 2005/0150149 A1* | 7/2005 | Highby | A01M 31/06 43/3 |
| 2005/0223615 A1* | 10/2005 | Fencel | A01M 31/06 43/3 |
| 2006/0143969 A1* | 7/2006 | Lindaman | A01M 31/06 43/2 |
| 2007/0180755 A1* | 8/2007 | Neeley | A01M 31/06 43/2 |
| 2008/0092427 A1* | 4/2008 | Brint | A01M 31/06 43/2 |
| 2009/0007479 A1* | 1/2009 | Jerome, Sr. | A01M 31/06 248/156 |
| 2009/0235571 A1* | 9/2009 | Wyant | A01M 31/06 43/2 |
| 2009/0260274 A1* | 10/2009 | Rogers | A01M 31/06 43/2 |
| 2013/0014422 A1* | 1/2013 | Bullerdick | A01M 31/06 43/3 |
| 2013/0104443 A1* | 5/2013 | Cramer | A01M 31/06 43/2 |
| 2013/0185986 A1* | 7/2013 | Stiffler | A01M 31/06 43/3 |
| 2014/0245652 A1* | 9/2014 | Franklin | A01M 31/06 43/2 |
| 2015/0164063 A1* | 6/2015 | Rutledge | A01M 31/06 43/2 |
| 2015/0181861 A1* | 7/2015 | Butz | A01M 31/06 43/2 |
| 2017/0181423 A1* | 6/2017 | Xu | A01M 99/00 |
| 2019/0335744 A1* | 11/2019 | Rodriguez | F16M 11/18 |

* cited by examiner

GAME DECOY SYSTEM

CROSS-REFERENCE TO RELATED APPLICATION

The application claims priority to U.S. Provisional Application entitled "Game decoy system," Ser. No. 63/191,478, filed May 21, 2021, which is incorporated herein by reference in its entirety.

BACKGROUND

The present disclosure is directed to a game decoy, specifically a decoy system with multiple decoy pivots.

Current game decoys on the market only allow for one decoy that remains stationary during deployment. The decoy cannot move without the use of a motor or battery power, which may be illegal to use in certain jurisdictions or for certain types of decoys. In order to simulate a flock or herd, each decoy must be separately deployed on its own stake.

There is an unmet need in the art for a system capable of multiple decoys moving independently, without battery or motor aid, which simulates the movements of a flock or herd on a single stake.

SUMMARY OF THE INVENTION

Disclosed herein is a wind-aided game decoy system that allows for multiple decoys moving independently which simulates the movement of a flock or herd on a single support. The game decoy system 100 comprises:

a wheel hub 130 rotatably mounted to a support, such as a stake 140;

at least one pivot channel 131 located in the wheel hub 130;

at least one pivot arm 120 having a proximal segment 121, a medial segment 122, and a distal segment 123, wherein the pivot arm 120 is rotatably connected at the proximal segment 121 to the pivot channel 131; and at least one game decoy 110 rotatably mounted to the distal segment 123 of the pivot arm 120.

As disclosed herein, the wheel hub 130 is the main component of the decoy system to which the pivot arms 120 are attached. The wheel hub 130 rotates 360° about the support and also works with the pivot arms 120, ensuring lifelike movement of the decoys.

In some versions, multiple pin bores 134 are drilled along the peripheral edge of the wheel hub 130 that allow a user to adjust the swing on the pivot arms 120 with insertion and removal of pins 135. Removal of all pins 135 allows the pivot arms 120 to swing freely; pins 135 inserted into the pin bores 134 directly adjacent to the pivot channels 131 restrict rotation of the pivot arms 120 to between the pins 135.

In one embodiment of the disclosure, such as the system 100, the support is a stake 140 having a first end 141 and a second end 142. The first end 141 of the stake 140 is inserted into a ground. The second end 142 of the stake 140 is connected to the wheel hub 130.

In another embodiment of the disclosure, such as the system 200, the support comprises:

a stake 240 having a first end 241 and a second end 242, wherein the first end 241 is inserted into a ground;

a bearing case 260 connected to the second end 242 of the stake 240;

an extension arm 250 having a proximal segment 251, a medial segment 252, and a distal segment 253, wherein the extension arm 250 is rotatably connected at the proximal segment 251 to the bearing case 260, and rotatably connected at the distal segment 253 to the wheel hub 130.

The system 200 moves the wheel hub 130 away from the stake 240 by using an extension arm 250 that connects to the bearing case 260 and runs to the wheel hub 130. In some versions, the bearing case 260 comprises a bushing 262 that holds two bearings 263 to allow the inserted extension arm 250 to freely rotate 360° about the bearing case 260.

The objects and advantages of the invention will appear more fully from the following detailed description of the preferred embodiment of the invention made in conjunction with the accompanying drawings.

DETAILED DESCRIPTION OF THE INVENTION

In the present description, certain terms have been used for brevity, clarity and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
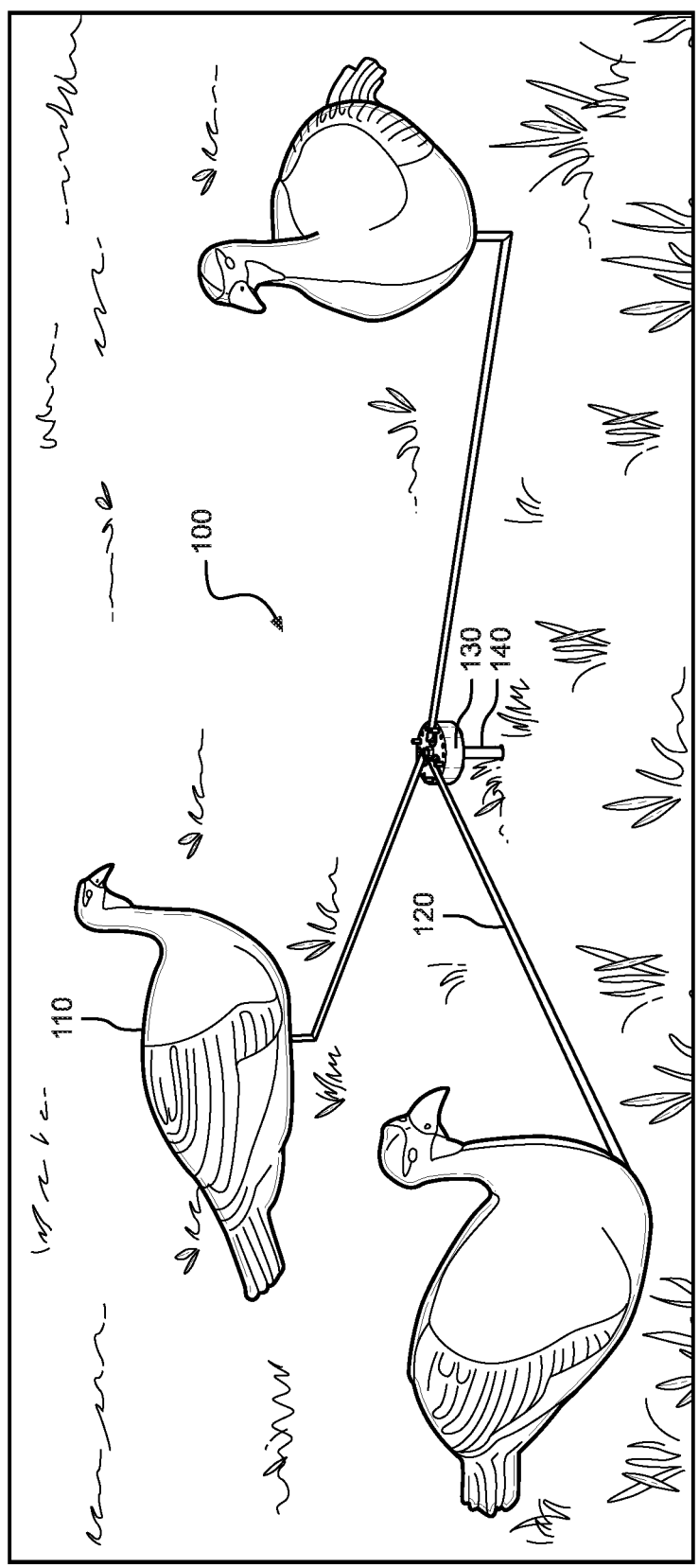
FIG. 1 is a perspective view of a first embodiment of a game decoy system with decoys attached.
Figure 2:
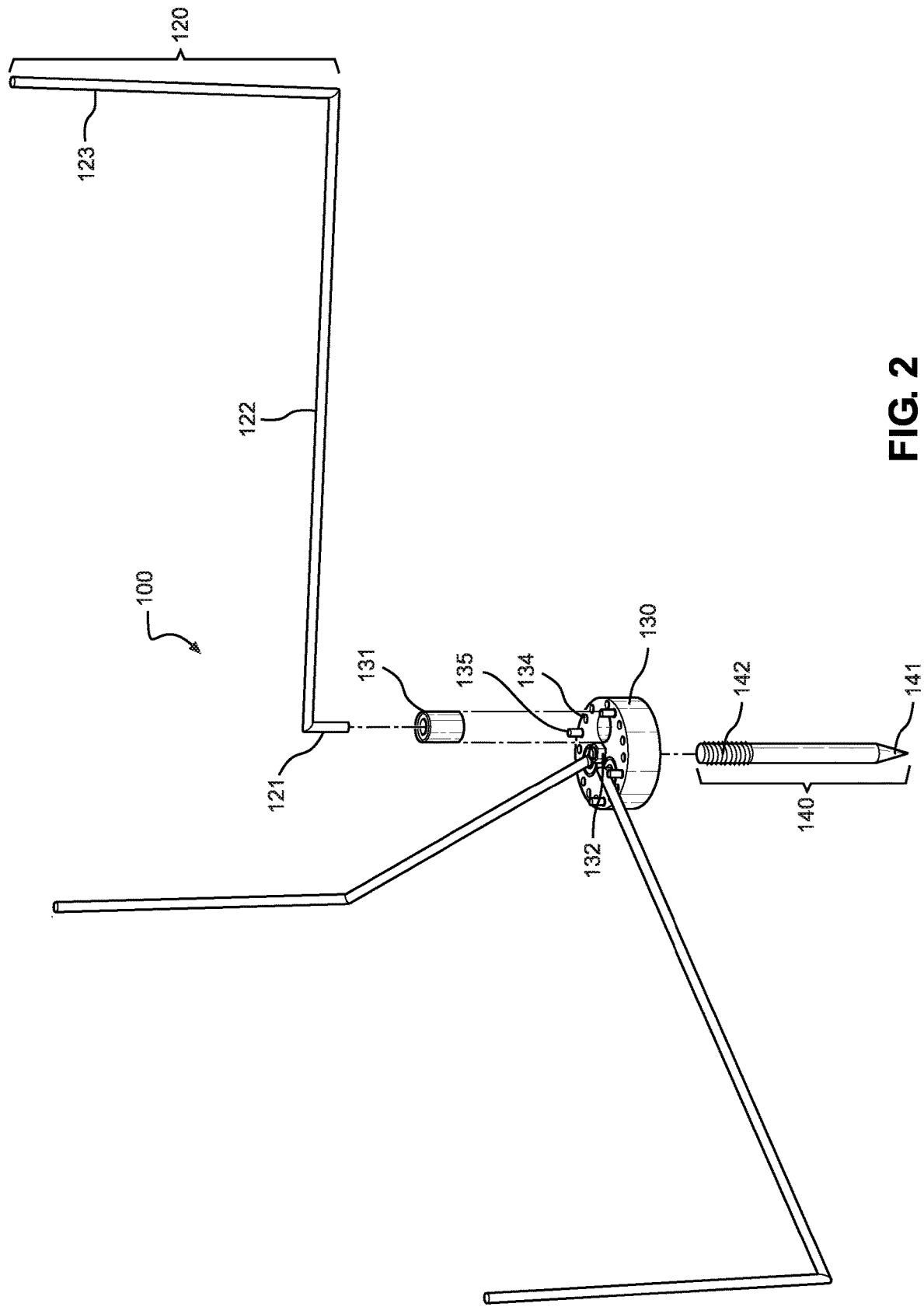
FIG. 2 is an exploded view of the first embodiment of the game decoy system without decoys.
Figure 3:
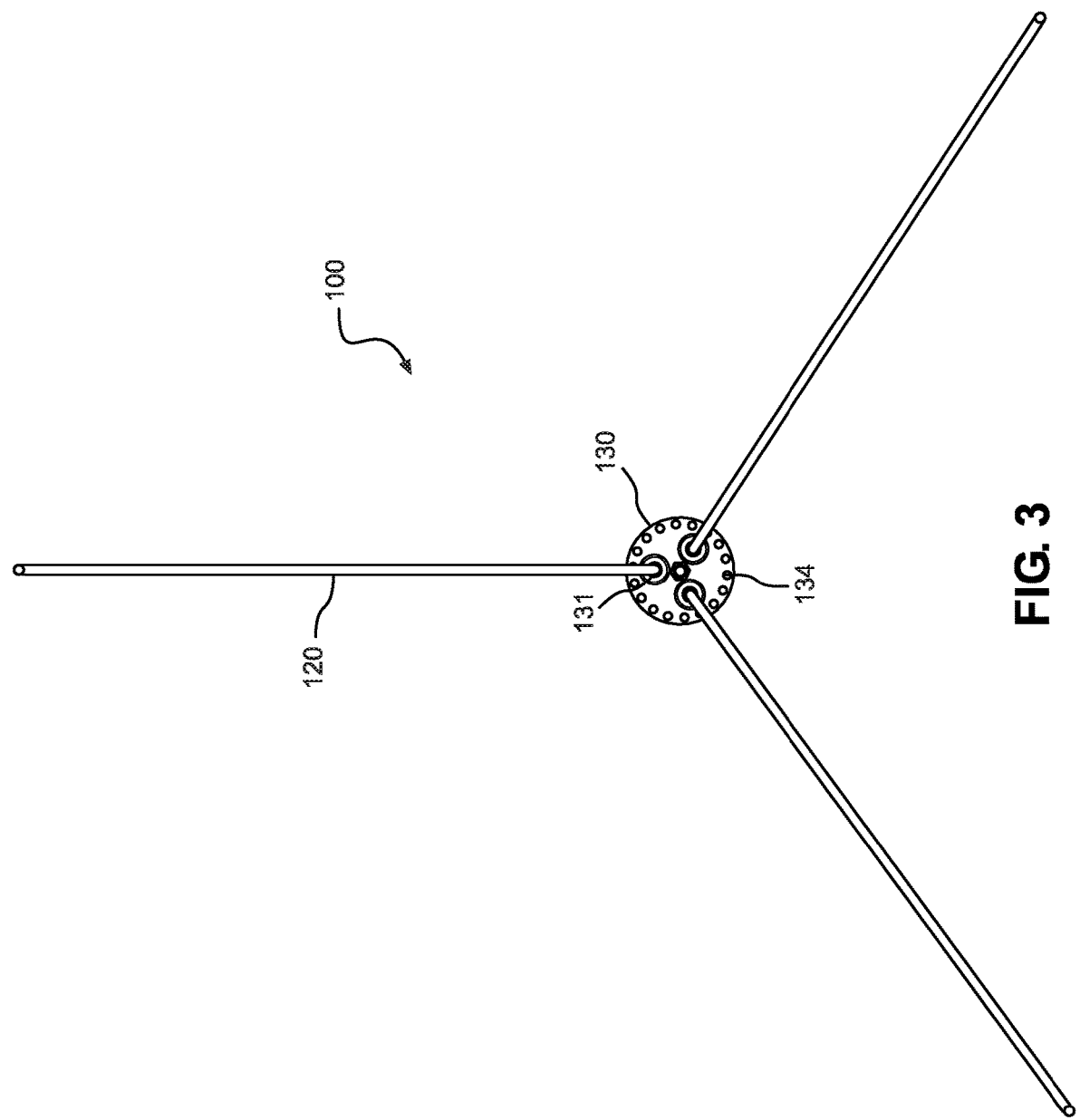
FIG. 3 is a top view of the first embodiment of the game decoy system without decoys.

Referring to FIGS. 1-4, a first embodiment of the disclosure includes a game decoy system 100 that holds multiple game decoys 110. The system 100 is a wind-aided animal decoy system comprising multiple pivot arms 120 and a wheel hub 130 attached to a single stake 140. The wheel hub 130, which sits on top of the stake 140 after the stake 140 is inserted into the ground, allows for multiple decoys 110. Each decoy 110 rotatably sits on a separate pivot arm 120. Each pivot arm 120 is in turn inserted into one of the pivot channels 131 located in the wheel hub 130 (FIG. 3).

When the system 100 is set up, each decoy 110 is on its own separate pivot arm 120 moving independently and, therefore, is presented in a life-like manner as if the decoys 110 are moving in a small flock. The wheel hub 130 is the main component of the decoy system 100 to which the pivot arms 120 are attached. The wheel hub 130 rotates 360° about the stake 140 and also works with the pivot arms 120, ensuring lifelike movement of the decoys 110. Because the system 100 can hold multiple decoys 110 that move independent of each other on one stake 140, the system 100 simulates lifelike movements.

Figure 4:
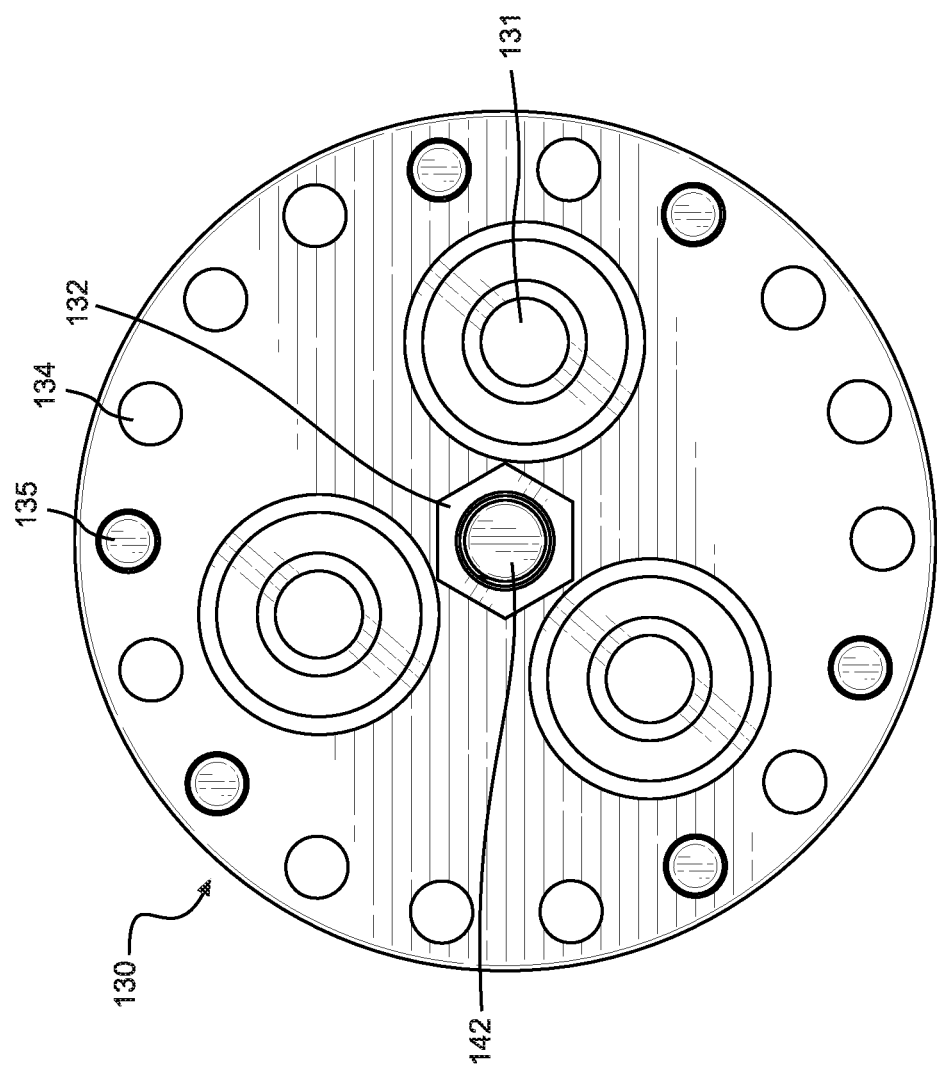
FIG. 4 is a top view of a wheel hub of the game decoy system.

In the exemplary embodiment shown in FIGS. 1-4, the stake 140 comprises a first end 141 and a second end 142. The first end 141 is inserted into the ground and the second end 142 is connected to the wheel hub 130. The stake 140 may be manufactured in any manner that allows the first end 141 to be inserted into the ground and the second end 142 to be connected to the wheel hub 130. In preferred versions, the first end 141 is tapered to be inserted into the ground and the second end 142 is threaded to connect to the wheel hub 130 with a nut 132 (FIG. 4). The wheel hub 130 on the second end 142 of the stake 140 is a wheel on a wheel bearing to allow the wheel hub 130 to freely rotate 360° about the stake 140. Certain versions may also include a tilt hub (not shown) between the wheel hub 130 and the stake 140, allowing the wheel hub 130 to tilt relative to the vertical axis of the stake 140.

In preferred versions, the pivot channels 131 are bored and set into the wheel hub 130. In a particular version, the pivot channels 131 are round bearings that receive the inserted pivot arms 120 and allows the pivot arms 120 to freely rotate about the pivot channels. As shown in FIG. 2, each pivot arm 120 has a proximal segment 121, a medial segment 122, and a distal segment 123. The proximal segment 121 is a vertical segment inserted into the pivot channels 131 on the wheel hub 130. The proximal segment 121 is connected at an upper end with a 90° bend to the medial segment 122. The medial segment 122 extends horizontally out, then connects to a lower end of the vertical distal segment 123 with another 90° bend upward. The distal segment 123 extends to the point where the upper end is inserted into the decoy 110.

In addition, as shown in FIG. 4, multiple pin bores 134 drilled along the peripheral edge of the wheel hub 130 allow a user to adjust the swing on the pivot arms 120 with insertion and removal of pins 135. Removal of all pins 135 allows the pivot arms 120 to swing freely; pins 135 inserted into the pin bores 134 directly adjacent to the pivot channels 131 restrict rotation of the pivot arms 120 to between the pins 135.

A method of installing the decoy system 100 comprises firstly inserting the stake 140 into the ground with the tapered end 141 pointing down. Then the wheel hub 130 is attached to the threaded end 142 of the stake 140 with the connection nut 132. Once the wheel hub 130 is in place, the pivot arms 120 are inserted into the pivot channels 131 on the wheel hub 130. After the pivot arms 120 are attached to the wheel hub 130, the user can place the decoys 110 on the distal ends 123 of the pivot arms 120. This setup simulates the movements of a small flock of game animals on one system. Total time to set up the decoy system 100 is approximately 90 seconds.

Figure 5:
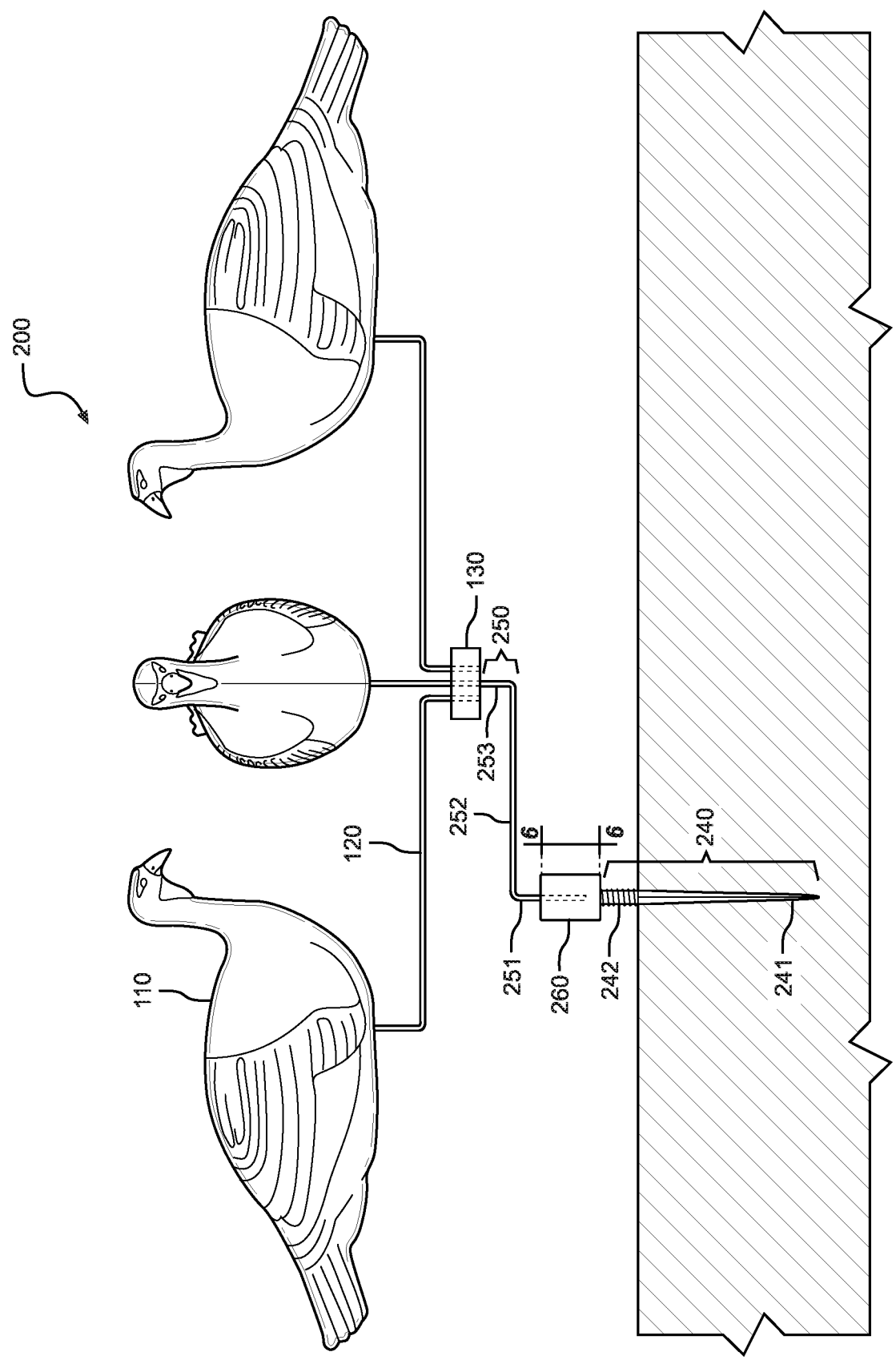
FIG. 5 is a side view of a second embodiment of a game decoy system.

Referring to FIG. 5, a second embodiment of the disclosure includes a game decoy system 200 that varies from the system 100 in that the wheel hub 130 is moved away from the stake 240 by using an extension arm 250 that connects to a bearing case 260 and runs to the wheel hub 130. The stake 240 comprises a first end 241 and a second end 242. The first end 241 is inserted into the ground and the second end 242 is connected to the bearing case 260. The stake 240 may be manufactured in any manner that allows the first end 241 to be inserted into the ground and the second end 242 to be connected to the bearing case 260. In preferred versions, the first end 241 is tapered to be inserted into the ground and the second end 242 is bored to receive the threaded end 264 (shown in FIG. 6) of the bearing case 260. The extension arm 250 comprises a proximal segment 251, a medial segment 252, and a distal segment 253. The proximal segment 251 is a vertical segment inserted to the bearing case 260. The proximal segment 251 is connected at an upper end with a 90° bend to the medial segment 252. The medial segment 252 extends horizontally out, then connects to a lower end of the vertical distal segment 253 with another 90° bend upward. The distal segment 253 extends to the point where the upper end is connected to the wheel hub 130. In a preferred version, the distal segment 253 of the extension arm 250 is threaded to connect to the wheel hub 130 with a nut 132. Configurations of the wheel hub 130, pivot arms 120, and decoys 110 in the system 200 are identical as the system 100.

Figure 6:
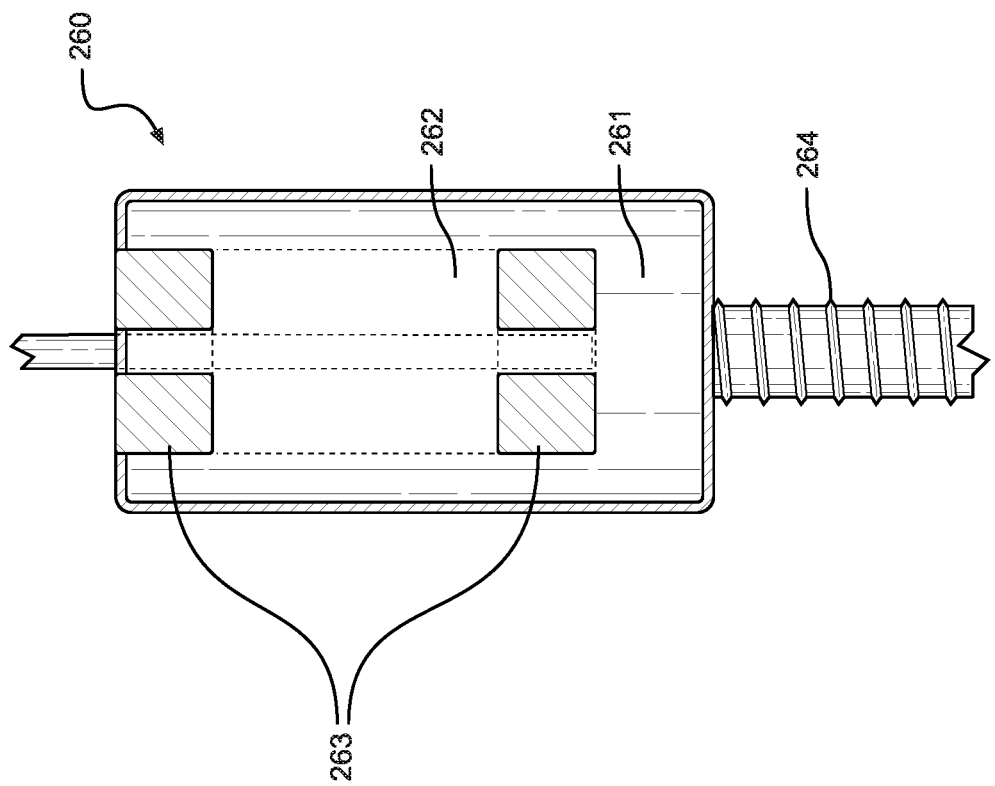
FIG. 6 is a cross-sectional view of a bearing case of the second embodiment of the game decoy system, taken at lines 6-6 of FIG. 5.

The bearing case 260 may be manufactured to any configuration that allows the inserted extension arm 250 to freely rotate 360° about the bearing case. An exemplary configuration of the bearing case 260 is shown in FIG. 6, wherein the bearing case 260 comprises a cylinder-shaped housing unit 261, within which is a round bushing 262 that holds two round bearings 263 to allow the inserted extension arm 250 to freely rotate 360° about the bearing case 260. A threaded end 264 allows the bearing case 260 to be connected to the stake 240 by screwing the threaded end 264 into the bored end 242 of the stake 240.

A method to install the decoy system 200 comprises firstly inserting the stake 240 into the ground with the tapered end 241 pointing down. Then the bearing case 260 is attached to the stake 240 by screwing the threaded end 264 into the bored end 242 of the stake 240. Once the bearing case is in place, the proximal segment 251 of the extension arm 250 is inserted into the bearing case 260. Then the distal segment 253 of the extension arm 250 is attached to the wheel hub 130 with the connection nut 132. Once the wheel hub 130 is in place, the pivot arms 120 are inserted into the pivot channels 131 on the wheel hub 130. After the pivot arms 120 are attached to the wheel hub 130, the user can place the decoys 110 on the distal ends 123 of the pivot arms 120.

The system 200 allows the decoys 110 to move 360° about and around the stake 240 in the wind. This creates even more of a lifelike effect of a flock foraging and traveling in unison about and around the stake 240. This also helps to prevent the decoy system to act too erratically during more windy conditions.

The invention disclosed herein allows the decoys to move in a lifelike manner and becomes more effective with the wind. The invention also allows the decoys to move without the use of a motor or battery power. The invention allows for at least one decoy moving independently which simulates the movements of a flock on only one stake. In the exemplary embodiments, the system 100 and 200 hold 3 decoys. However, the exemplary embodiments may be modified to hold 1, 2, 4, 5, 6 or more decoys by altering the number of the pivot channels 131 and the pivot arms 120.

The invention may use any animal decoys. In the exemplary embodiments, the decoys 110 are turkey decoys (FIGS. 1 and 5). The components of the invention may be made of any suitable materials. Preferably, the pivot arms 120 and the extension arm 250 are round aluminum stocks. The exemplary embodiments herein use hollow foam decoys. The same concept with heavier decoys 110 can be used as long as heavier hardware is used for the pivot arms 120 and the extension arm 250.

The invention may be made to have any dimensions. For instance, the stakes 140 and 240 may have 10" diameter. The wheel hub 130 may be a 3⅛" wheel that holds ¼" round bearings as the pivot channels 131. The proximal segment 121 of the pivot arm 120 may be 2" high, connected to a 26½" long medial segment 122 and a 11" high distal segment 123. The dimensions may be varied by one of ordinary skill in the art within the scope of the invention.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the foregoing description.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The systems and methods of the present invention can comprise, consist of, or consist essentially of the essential elements and limitations described herein, as well as any additional or optional steps, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A game decoy system comprising:
   a wheel hub rotatably mounted to a support;
   at least one pivot channel located in the wheel hub;
   at least one pivot arm having a proximal segment, a medial segment, and a distal segment, wherein the at least one pivot arm is rotatably connected at the proximal segment to the at least one pivot channel; and
   at least one game decoy rotatably mounted to the distal segment of the at least one pivot arm;
   wherein the support comprises:
      a stake having a first end and a second end, wherein the first end is inserted into a ground;
      a bearing case connected to the second end of the stake;
      an extension arm having a proximal segment, a medial segment, and a distal segment, wherein the extension arm is rotatably connected at the proximal segment thereof to the bearing case, and rotatably connected at the distal segment thereof to the wheel hub.

2. The game decoy system of claim 1, wherein the wheel hub is on a wheel bearing to allow the wheel hub to rotate 360° about the support.

3. The game decoy system of claim 1, wherein the at least one pivot channel is bored and set into the wheel hub.

4. The game decoy system of claim 1, wherein the at least one pivot channel is a round bearing that receives the at least one pivot arm when the at least one pivot arm is inserted therein.

5. The game decoy system of claim 1, wherein the at least one pivot arm is round aluminum stock.

6. The game decoy system of claim 1, wherein the proximal segment of the at least one pivot arm is a vertical segment, connected at an upper end thereof with a 90° bend to the medial segment of the at least one pivot arm.

7. The game decoy system of claim 6, wherein the medial segment of the at least one pivot arm extends horizontally out from the upper end of the proximal segment of the at least one pivot arm and connects to a lower end of the distal segment of the at least one pivot arm with a 90° bend upward.

8. The game decoy system of claim 1, wherein at least one pin bore is drilled along a peripheral edge of the wheel hub.

9. The game decoy system of claim 8, wherein at least one pin is inserted into the at least one pin bore to restrict rotation of the at least one pivot arm between the at least one pin.

10. The game decoy system of claim 1, wherein the bearing case comprises a bushing that holds two bearings to allow the extension arm to rotate 360° about the bearing case when the extension arm is inserted therein.

11. The game decoy of claim 1, wherein the proximal segment of the extension arm is a vertical segment, connected at an upper end thereof with a 90° bend to the medial segment of the extension arm.

12. The game decoy system of claim 11, wherein the medial segment of the extension arm extends horizontally out from the upper end of the proximal segment of the extension arm and connects to a lower end of the distal segment of the extension arm with a 90° bend upward.

13. The game decoy system of claim 1, wherein the distal segment of the extension arm is threaded to connect to the wheel hub with a nut.

14. A game decoy system comprising:
   a stake having a first end and a second end, wherein the first end is inserted into a ground;
   a bearing case connected to the second end of the stake;
   an extension arm having a proximal segment, a medial segment, and a distal segment, wherein the extension arm is rotatably connected at the proximal segment to the bearing case;
   a wheel hub rotatably mounted to the distal segment of the extension arm;
   at least one pivot channel located in the wheel hub;
   at least one pivot arm having a proximal segment, a medial segment, and a distal segment, wherein the at least one pivot arm is rotatably connected at the proximal segment to the at least one pivot channel; and at least one game decoy rotatably mounted to the distal segment of the at least one pivot arm.

\* \* \* \* \*